US011953946B2

(12) United States Patent
Cheng (10) Patent No.: US 11,953,946 B2
(45) Date of Patent: Apr. 9, 2024

(54) ELECTRONIC DEVICE, PORTABLE KEYBOARD STRUCTURE AND ASSEMBLY METHOD THEREOF

(71) Applicant: GETAC TECHNOLOGY CORPORATION, New Taipei (TW)

(72) Inventor: Yao-Kun Cheng, Taipei (TW)

(73) Assignee: GETAC TECHNOLOGY CORPORATION, New Taipei (TW)

( * ) Notice: Subject to any disclaimer, the term of this patent is extended or adjusted under 35 U.S.C. 154(b) by 190 days.

(21) Appl. No.: 17/586,641

(22) Filed: Jan. 27, 2022

(65) Prior Publication Data

US 2022/0413557 A1 Dec. 29, 2022

Related U.S. Application Data

(60) Provisional application No. 63/214,175, filed on Jun. 23, 2021.

(51) Int. Cl.
*G06F 1/16* (2006.01)
(52) U.S. Cl.
CPC .......... *G06F 1/1662* (2013.01); *G06F 1/1632* (2013.01); *G06F 1/1656* (2013.01)
(58) Field of Classification Search
CPC .... G06F 1/1601; G06F 1/1613; G06F 1/1632; G06F 1/1656; G06F 1/1662; G06F 3/0202; G06F 1/1654; H04M 1/0249; H04M 1/185; H05K 5/00; H05K 5/0004; H05K 5/0008; H05K 5/0017; H05K 5/0018

See application file for complete search history.

(56) References Cited

U.S. PATENT DOCUMENTS

| | | | | |
|---|---|---|---|---|
| 5,237,486 A * | 8/1993 | LaPointe | ................. | G06F 1/203 361/728 |
| 6,900,984 B2 * | 5/2005 | Merz | ..................... | H01L 23/427 361/679.55 |
| 7,457,111 B2 * | 11/2008 | Merz | ..................... | G06F 1/1662 361/679.33 |
| 8,511,498 B2 * | 8/2013 | Kenney | ............... | B29C 45/0055 361/679.02 |
| 9,098,238 B2 * | 8/2015 | Richardson | .......... | H04B 1/3888 |

(Continued)

FOREIGN PATENT DOCUMENTS

JP    H11284358 A  * 10/1999

*Primary Examiner* — Nidhi Thaker
(74) *Attorney, Agent, or Firm* — Cooper Legal Group, LLC (57) ABSTRACT

A portable keyboard structure includes a plastic substrate, multiple metal support plates, a plastic bottom cover and multiple buffer members. The plastic substrate has a mounting surface, the metal support plates are mounted on corners of the mounting surface, the plastic bottom cover is disposed corresponding to the mounting surface and in conjunction with the plastic substrate clamps and secures the metal support plates, and the buffer members are respectively configured corresponding to the metal support plates. Each buffer member includes a fixing portion and a protection portion, the fixing portion are respectively disposed at the corresponding metal support plates, and the protection portions respectively envelop corners of the plastic substrate. Thus, the weight of the keyboard structure is significantly reduced, the production cost is lowered, and certain structural strength and fall-resistance are maintained at the same time.

19 Claims, 7 Drawing Sheets

(56) References Cited

U.S. PATENT DOCUMENTS

| | | | |
|---|---|---|---|
| 9,148,966 B2* | 9/2015 | Tachikawa | H05K 5/0086 |
| 9,342,100 B2* | 5/2016 | Fourie | G06F 1/1656 |
| 9,904,373 B2* | 2/2018 | Shirata | G06F 3/0231 |
| 10,280,516 B2* | 5/2019 | Chan | C25D 11/04 |
| 10,331,178 B2* | 6/2019 | Shah | G06F 1/169 |
| 10,712,781 B2* | 7/2020 | Lin | G06F 1/1656 |
| 11,029,722 B2* | 6/2021 | Lee | G06F 1/183 |
| 11,294,425 B2* | 4/2022 | Hsu | G06F 1/1616 |
| 11,614,773 B2* | 3/2023 | Lee | H02G 15/10 361/679.01 |
| 2004/0246666 A1* | 12/2004 | Maskatia | G06F 1/1624 361/679.57 |
| 2012/0050973 A1* | 3/2012 | Sakuma | G06F 1/1662 361/679.09 |
| 2014/0361669 A1* | 12/2014 | Jarvis | H04M 1/0202 29/445 |

* cited by examiner

ELECTRONIC DEVICE, PORTABLE KEYBOARD STRUCTURE AND ASSEMBLY METHOD THEREOF

CROSS-REFERENCE TO RELATED APPLICATIONS

The application claims the benefit of a U.S. Provisional Patent Application No. 63/214,175, filed on Jun. 23, 2021, the disclosure of which is hereby incorporated by reference herein in its entirety.

BACKGROUND OF THE INVENTION

Field of the Invention

The present invention relates to a keyboard structure, and more particularly to a lightweight, impact-resistant and deformation-resistant portable keyboard structure.

Description of the Prior Art

Accompanied with busy and fast-paced daily lives of the modern people, electronic devices are required to be lightweight and readily portable, and so numerous laptop computers and portable electronic devices have been developed. Moreover, to prevent accidental falling while being carried or taken by a user and thus from deformation caused by collisions, a common laptop computer or portable electronic device adopts a high-strength metal structure, thereby enhancing the overall strength or meeting falling specifications of military standards.

However, because a main frame structure is made of metal, the overall weight may be heavier, and this may cause portability difficulties of a user. Even if an aluminum-magnesium alloy having a lighter weight is used, a certain weight difference still exists from a plastic housing structure. Further, a main housing structure made of metal may also be quite costly, hence increasing costs at a production end.

In view of the above drawbacks of the prior art, on the basis of extensive development with the practice of theories, the inventor has provided an invention for effectively improving the issues above in aim of improving and resolving the above issues.

SUMMARY OF THE INVENTION

It is a primary object of the present invention to provide a solution for significantly reducing the weight of a keyboard structure, lowering production costs and at the same time maintaining certain structural strength and fall-resistance.

To achieve the object above, the present invention provides a portable keyboard structure including a plastic substrate, a plurality of metal support plates, a plastic bottom cover and a plurality of buffer members. The plastic substrate has an operating surface and a mounting surface opposite to each other, wherein the operating surface is provided with a key area. The metal support plates are arranged on corners of the mounting surface. The plastic bottom cover is disposed corresponding to the mounting surface. The plastic bottom cover and the plastic substrate jointly clamp and secure the metal support plates. The buffer members are respectively configured corresponding to the metal support plates, and each buffer member includes a fixing portion and a protection portion. The fixing portions are respectively disposed at the corresponding metal support plate, and the protection portions respectively envelop corner of the plastic substrate.

To achieve the object above, the present invention further provides an assembly method for a portable keyboard structure. The method includes: providing a plastic substrate, a plurality of metal support plates, a plastic bottom cover and a plurality of buffer members, wherein the plastic substrate has a mounting surface, and each buffer member includes a fixing portion and a protection portion; disposing the metal support plates on corners of the mounting surface; disposing the plastic bottom cover corresponding to the mounting surface, such that the metal support plates are clamped and secured between the plastic bottom cover and the plastic substrate; and respectively disposing the fixing portions of the buffer members corresponding to the metal support plates such that the protection portions respectively envelop corners of the plastic substrate.

To achieve the object above, the present invention further provides an electronic device including a portable keyboard structure, an adaptor structure and a host. The portable keyboard structure includes a plastic substrate, a plurality of metal support plates, a plastic bottom cover and a plurality of buffer members. The plastic substrate has an operating surface and a mounting surface opposite to each other. The metal support plates are respectively disposed on corners of the mounting surface, and are clamped and secured jointly by the plastic bottom cover and the plastic substrate. The buffer members are disposed respectively corresponding to the metal support plates and protrude from corners of the plastic substrate. The adaptor structure is disposed on one side of the operating surface. The host is pivotally connected to the adaptor structure, and is capable of opening and closing corresponding to the operating surface.

The present invention further provides at least the following effects. With the fixing portions of the plastic member, the tolerance can be effectively controlled during injection to facilitate the combining with the metal support plates; the protection portions made of a rubber member are capable of providing a good buffer effect to absorb the impact produced by a collision; with side support strips, a support metal and stiffener ribs, the overall structure is reinforced to prevent deformation or breakage; with a handle installed on one side of the mounting surface, a user is provided with better portability.

DETAILED DESCRIPTION OF THE EMBODIMENTS

Details and technical contents of the present invention are given with the accompanying drawings below. It should be noted that the accompanying drawings are for illustration purposes and are not to be construed as limitations to the present invention.

Figure 1:
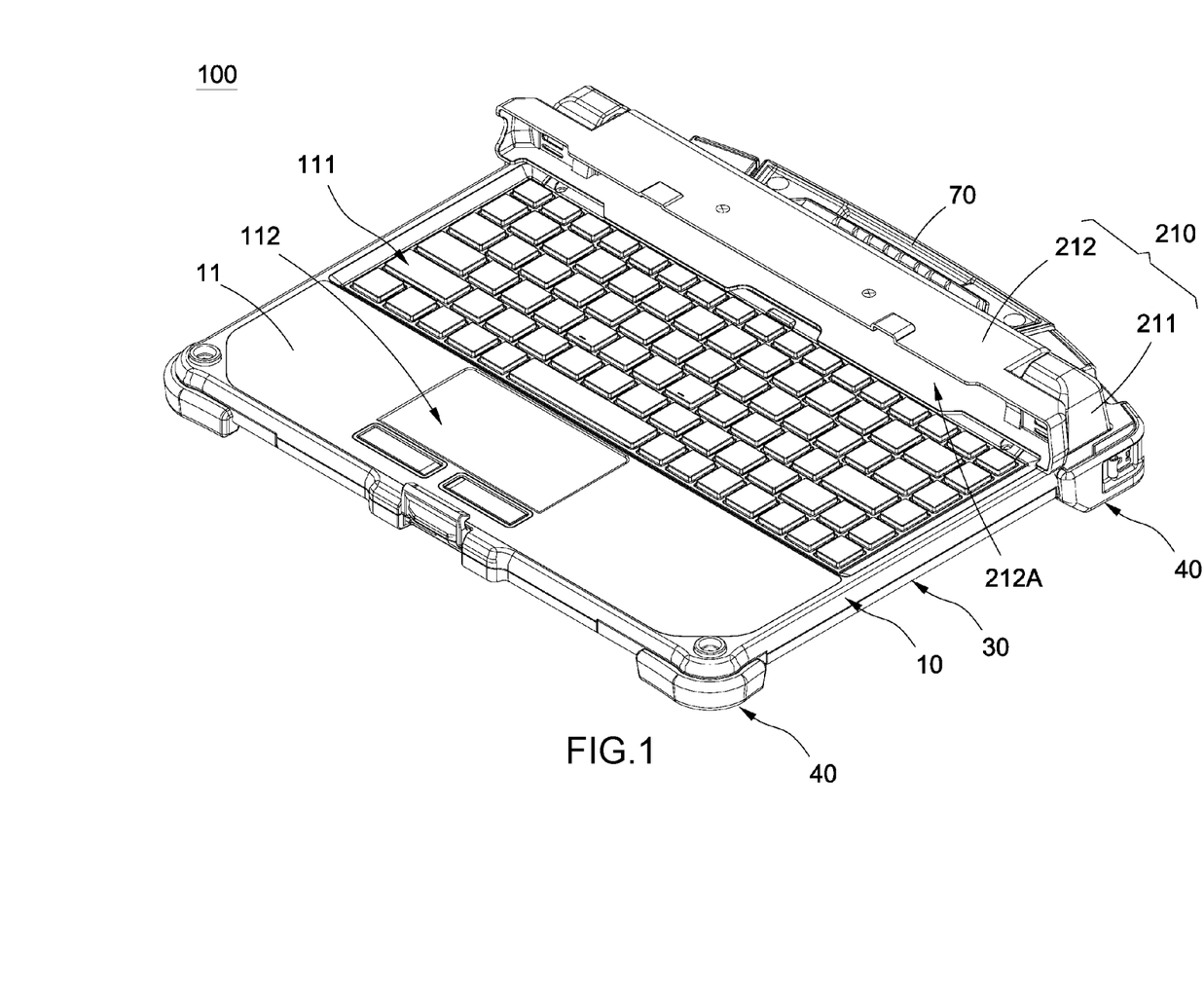
FIG. 1 is a three-dimensional appearance diagram of a portable keyboard structure of the present invention.
Figure 2:
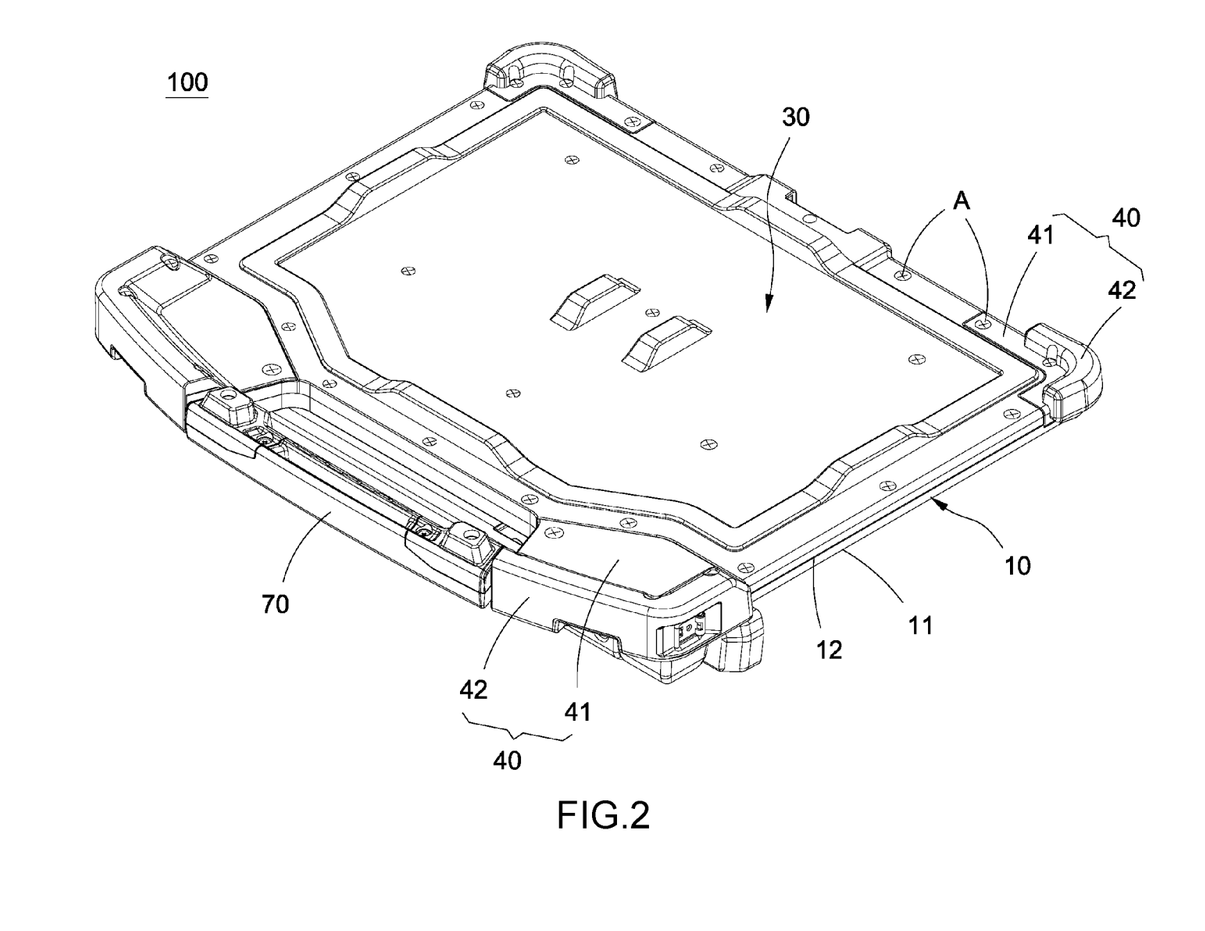
FIG. 2 is a three-dimensional appearance diagram of FIG. 1 from another perspective.
Figure 3:
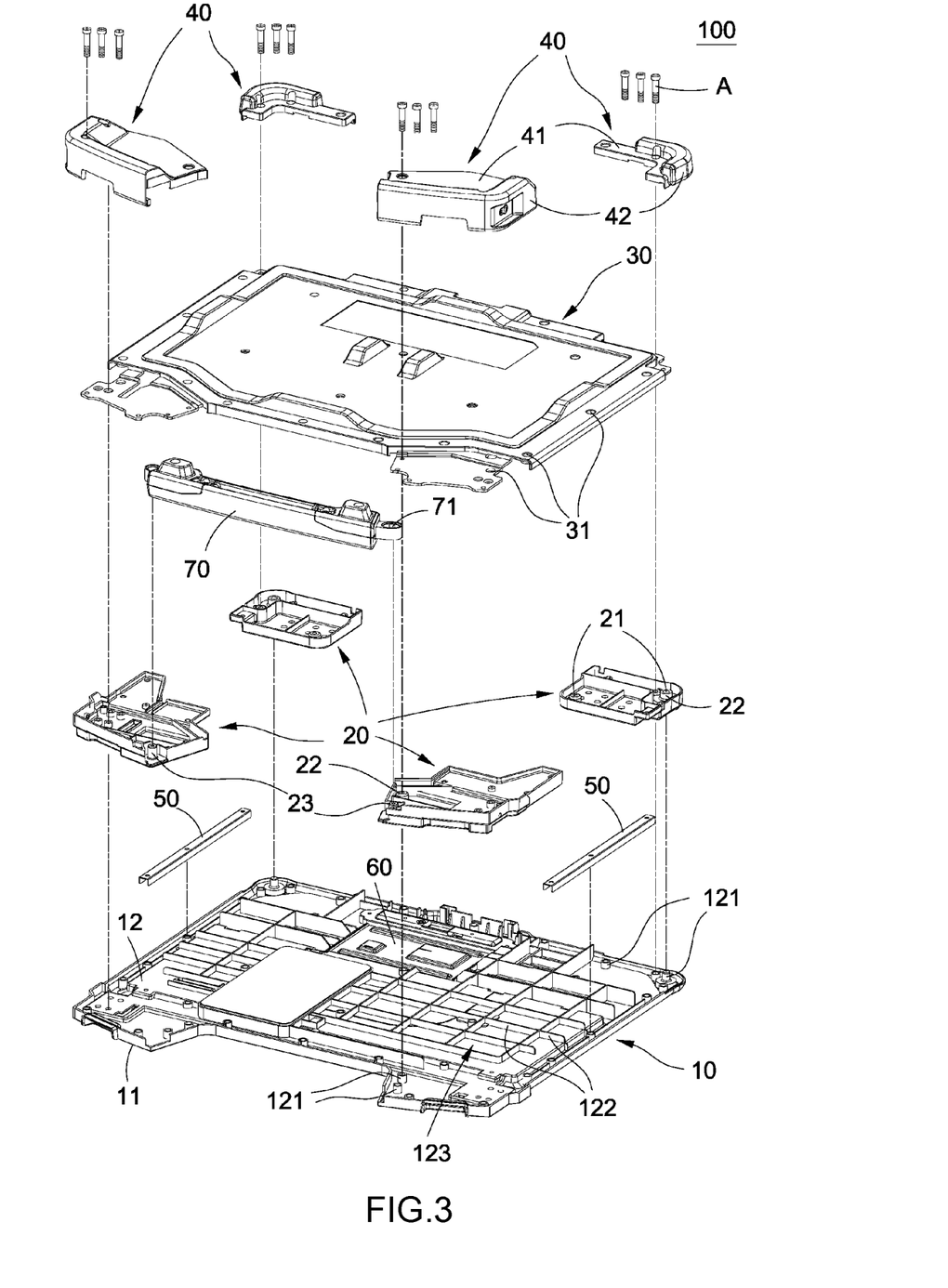
FIG. 3 is an exploded three-dimensional diagram of a portable keyboard structure of the present invention.

Referring to FIG. 1 to FIG. 3, the present invention provides a portable keyboard structure 100, which primarily includes a plastic substrate 10, a plurality of metal support plates 20, a plastic bottom cover 30 and a plurality of buffer members 40.

The plastic substrate 10 is shaped as a rectangle, and has an operating surface 11 and a mounting surface 12 opposite to each other. The operating surface 11 is provided with a key area 111 and a touch area 112 for a user to operate. In this embodiment, the plastic substrate 10 is made by means of plastic injection.

In this embodiment, the number of the metal support plates 20 is four, and each of the metal support plates 20 is an aluminum-magnesium alloy element; however, the present invention is not limited to the examples above. For example, each metal support plate 20 may also be other lightweight and high-strength metal elements. The metal support plates 20 are respectively disposed on corner ends of four corners of the mounting surface 12. Thus, the structural strength of the four corners of the plastic substrate 10 can be reinforced by the metal support plates 20, thus preventing any direct deformation or breakage in the event of a collision.

The plastic bottom cover 30 corresponds to the shape of the plastic substrate 10 and covers the mounting surface 12, and the plastic bottom cover 30 and the plastic substrate 10 jointly clamp and secure the metal support plates 20. In this embodiment, the plastic bottom cover 30 is made by plastic injection.

The buffer members 40 are respectively configured corresponding to the metal support plates 20. Thus, in this embodiment, the number of the buffer members 40 is also four; however, the present invention is not limited to the example above. The designer can adjust the number and positions of the buffer members 40 as needed. Each buffer member 40 includes a fixing portion 41 and a protection portion 42. The fixing portions 41 are respectively disposed at the corresponding metal support plates 20, and the protection portions 42 protrude from the plastic substrate 10 and respectively envelop the four corner ends of the plastic substrate 10. In this embodiment, the fixing portions 41 are plastic elements, the protection portions 42 are rubber elements, the fixing portions 41 and the protection portions 42 are made by means of dual-material injection; however, the present invention is not limited to the examples above. Thus, the tolerance of the fixing portions 41 in form of plastic elements can be effectively controlled during injection to facilitate the combining and fixing with the metal support plates 20; the protection portions 42 in form of rubber elements can provide good buffer effects so as to absorb the impact produced by any severe collisions.

In this embodiment, the plastic substrate 10 is provided with a plurality of protruding screw studs 121 on the four corners where the metal support plates 20 are disposed, and the metal support plates 20 and the plastic bottom cover 30 are provided with a plurality of through holes 21 and 31 corresponding to the positions of the screw studs 121, respectively. The fixing portions 41 of the buffer members 40 are respectively locked with the screw studs 121 of the plastic substrate 10 after passing a plurality of screw bolts A through the through holes 21 and 31 of the metal support plates 20 and the plastic bottom cover 30, thereby clamping and securing the plastic cover 30 and the metal support plates 20. It should be noted that the present invention is not limited to the examples above. For example, the plastic elements and the metal elements may also be combined and fixed by means of hot melting. Preferably, the metal support plates 20 may include positioning sleeves 22 formed on outer edges of the at least one of the through holes 21 and 31, and the positioning sleeves 22 may sleeve the corresponding screw studs 121 to achieve an effect of preliminary positioning.

Moreover, the portable keyboard structure 100 of the present invention may further include a plurality of side support strips 50 and a metal support 60. The side support strips 50 are respectively disposed on left and right sides of the mounting surface 12, and each of the side support strips 50 is clamped and secured by the two adjacent metal support plates 20; however, the present invention is not limited to the examples above. The metal support 60 corresponds to the touch area 112 of the operating surface 11 and is disposed on the mounting surface 12, and may be adhered by a waterproof adhesive tape (not shown) for preliminary securing; however, the present invention is not limited to the examples above. For example, the side support strips 50 and the metal support 60 may be made of stainless steel, but the present invention is not limited to the example above. The side support strips 50 and the metal support 60 may also be other high-strength metal elements. Thus, the side support strips 50 can further reinforce the structural strength on the two sides of the plastic substrate 10 and the plastic bottom cover 30, so as to prevent deformation or breakage caused by collisions received. The metal support 60 can reinforce the structure below the touch area 112, thus preventing deformation of the plastic substrate 10 when a press operation of the user is received. Moreover, the mounting surface 12 of the plastic substrate 10 includes a plurality of protruding stiffener ribs 122 formed on the mounting surface 12, and the stiffener ribs 122 are arranged in a matrix to form a plurality of quadrilateral slots 123. Thus, the stiffener ribs 122 may serve as support beam structures between the plastic substrate 10 and the plastic bottom cover 30, so as to prevent positions other than the metal support plates 20, the side support strips 50 and the metal support 60 having possible inadequate rigidity from deformation caused by external forces due to the lack of support of the plastic substrate 10 or the plastic bottom cover 30.

Preferably, the portable keyboard structure 100 of the present invention may further include a handle 70 for a user to carry the portable keyboard structure 100. In this embodiment, the handle 70 is made by means of plastic injection; however, the present invention is not limited to the example above. The handle 70 is disposed on one side of the mounting surface 12, and both ends of the handle 70 are respectively clamped and secured between the two metal support plates 20 and the two buffer members 40 on the side. Specifically, each of the two metal support plates 20 on the side includes a protruding positioning column 23, and each of both ends of the handle 70 has a positioning hole 71. The positioning holes 71 are respectively sleeved around the positioning columns 23, and the handle 70 is clamped and secured between the metal support plates 20 and the buffer members 40 by the buffer members 40 corresponding to the metal support plates 20.

It should be noted that, as shown in FIG. 3 to FIG. 6, an assembly method for the portable keyboard structure 100 of the present invention includes the following steps. First of all, the metal support 60 is mounted on a position of the mounting surface 12 of the plastic substrate 10 corresponding to the touch area 112, and is preliminarily fixed by a waterproof adhesive tape (not shown), as shown in FIG. 3.

Figure 4:
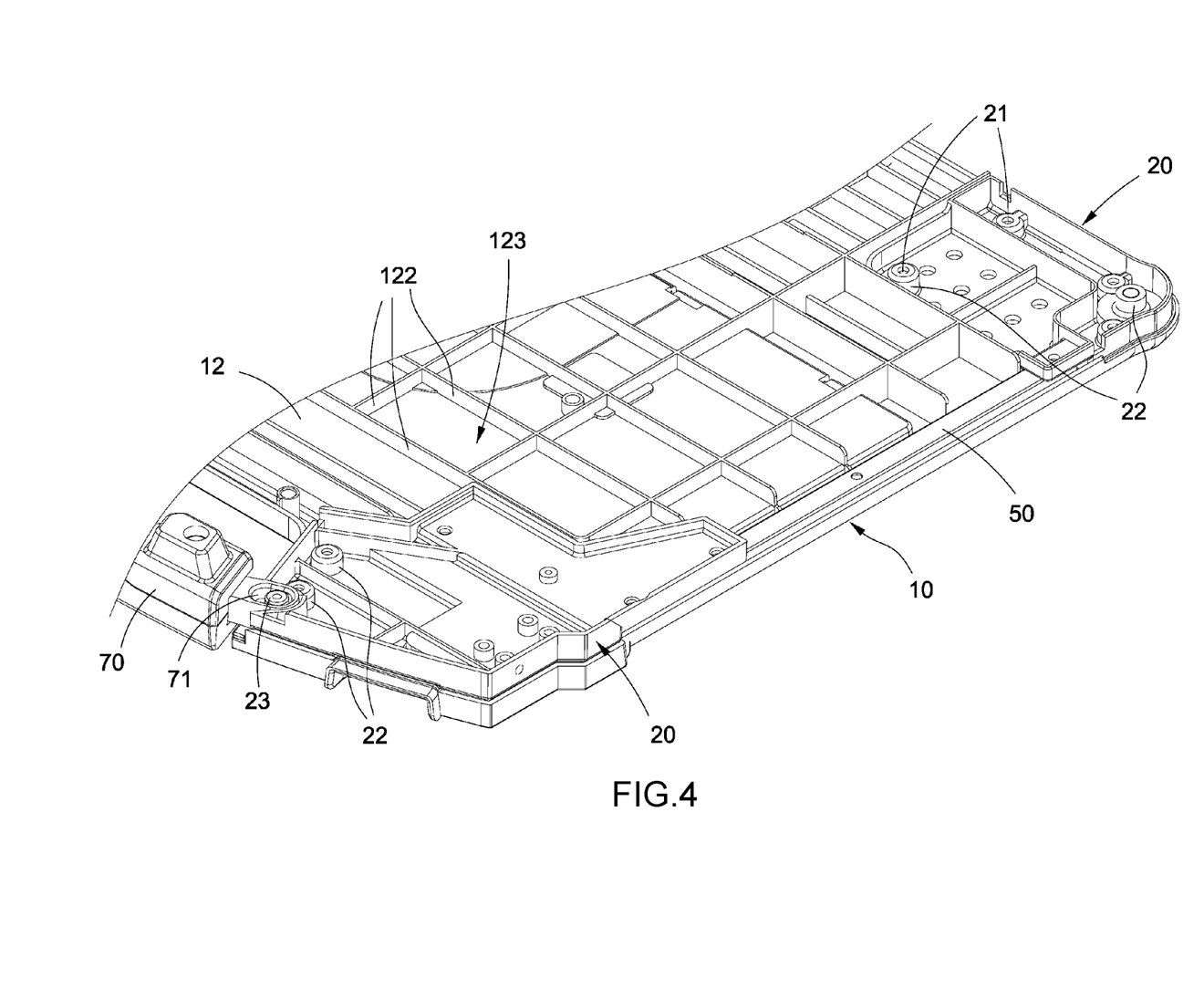
FIG. 4 to FIG. 6 are first to third schematic diagrams of assembly of a portable keyboard structure of the present invention.
Figure 5:
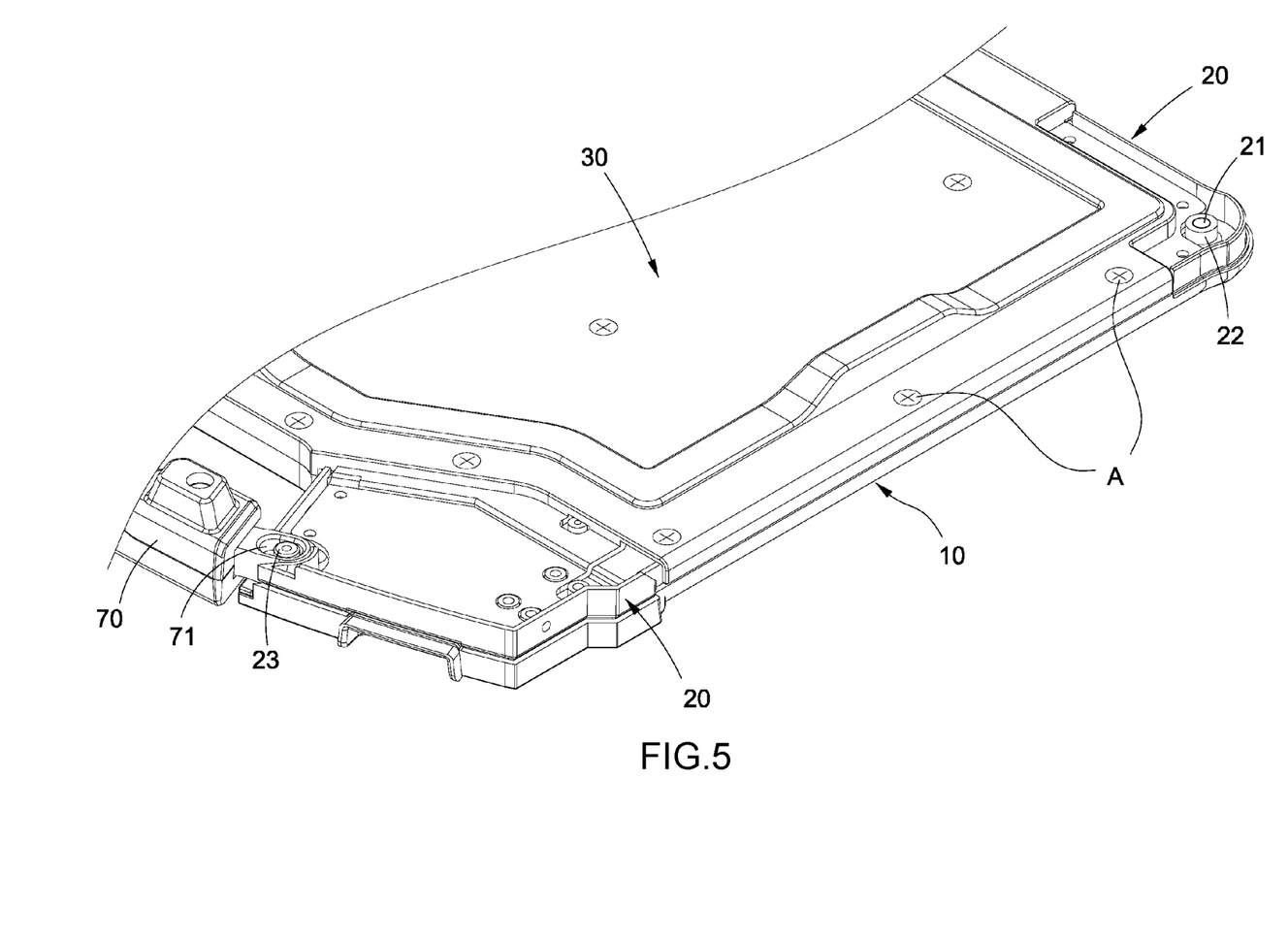
Figure 6:
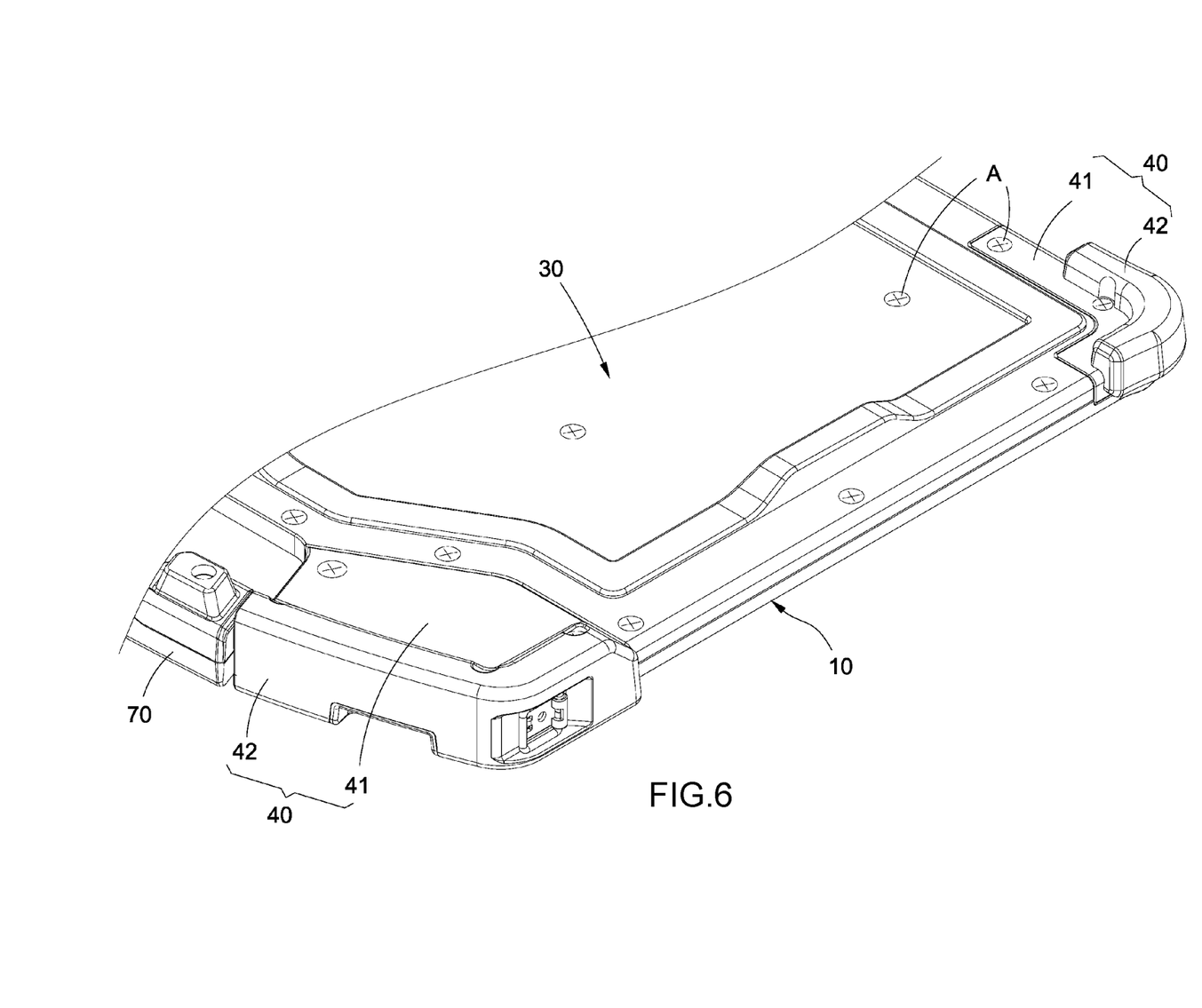

The side support strips 50 are disposed on left and right sides of the mounting surface 12, the metal support plates 20 are disposed on four corners of the mounting surface 12 to clamp and secure the side support strips 50, and the positioning sleeves 22 of the metal support plates 20 are respectively sleeved around the corresponding screw studs 121 for preliminary positioning, as shown in FIG. 4. Next, the plastic bottom cover 30 is arranged to correspondingly cover the mounting surface 12, such that the metal support 60 and the metal support plates 20 are tightly clamped and secured between the plastic bottom cover 30 and the plastic substrate 10, as shown in FIG. 5. Then, the positioning holes 71 on both ends of the handle 70 are respectively sleeved around the positioning columns 23 of the metal support plates 20. The fixing portions 41 of the buffer members 40 are arranged corresponding to the metal support plates 20, such that the protection portions 42 envelope in a protruding manner the four corners of the plastic substrate 10, and the buffer members 40 and the metal support plates 20 jointly clamp and secure both ends of the handle 70. Finally, a plurality of screw bolts A are sequentially passed through the buffer members 40, and the through holes 21 and 31 of the plastic bottom cover 30 and the metal support plates 20, and locked with the screw studs 121 of the plastic substrate 10 to complete the assembly, as shown in FIG. 6.

Figure 7:
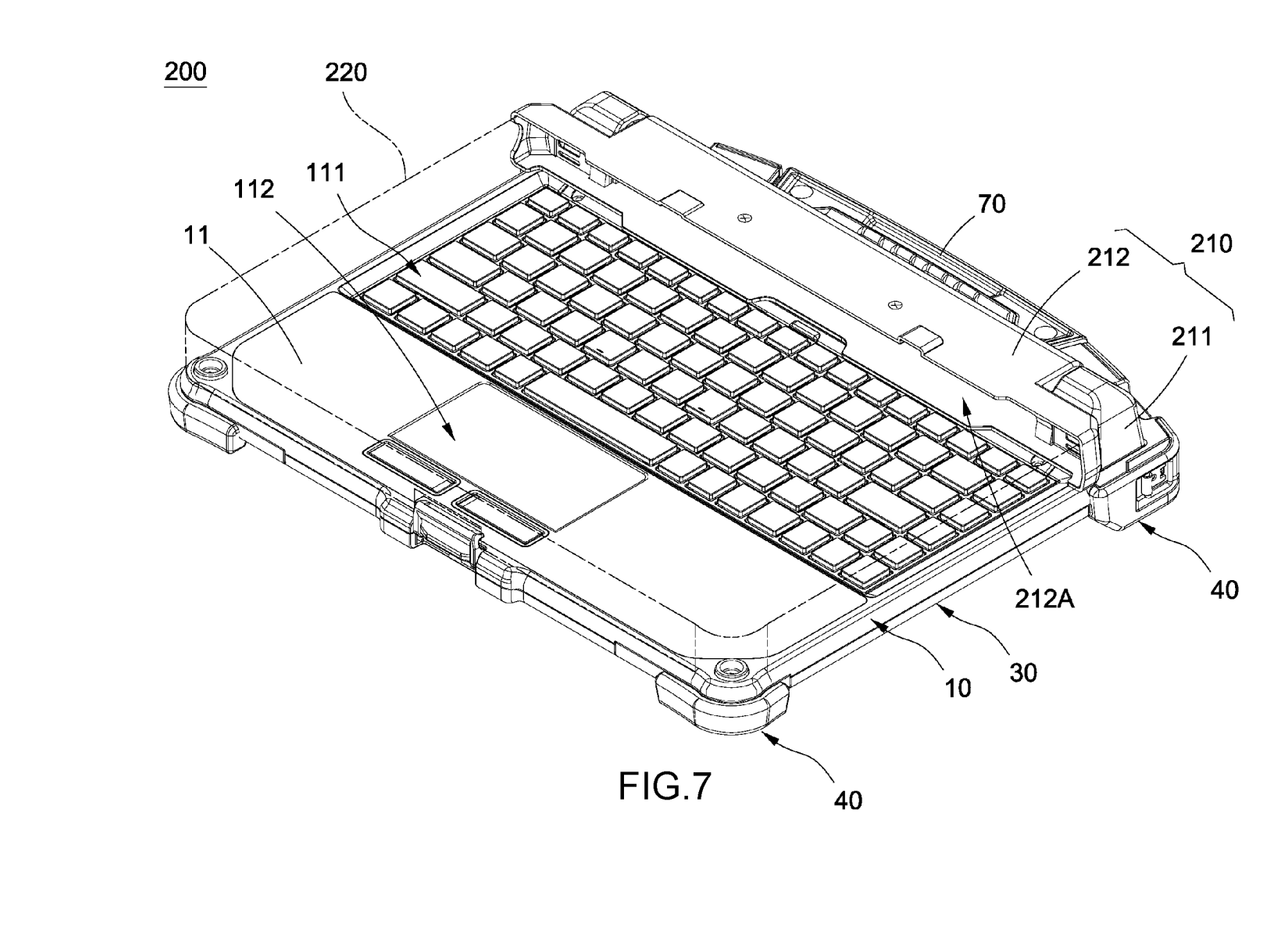
FIG. 7 is a three-dimensional appearance diagram of an electronic device of the present invention.

Referring to FIG. 7, the present invention further provides an electronic device 200 primarily including the portable keyboard structure 100 as described above, an adaptor structure 210 and a host 220.

The adaptor structure 210 is disposed on one side of the operating surface 11 of the plastic substrate 10. More specifically, the adaptor structure 210 is disposed on one side of the operating surface 11 near the handle 70. In this embodiment, the adaptor structure 210 includes a fixed portion 211 and a mobile portion 212. The fixed portion 211 is fixed on the operating surface 11, and the mobile portion 212 has a slot 212A and is pivotally connected to the fixed portion 211 so as to be pivotal relative to the fixed portion 211.

The host 220 is pivotally connected to the adaptor structure 210 and is capable of opening and closing relative to the operating surface 11. More specifically, one side of the host 220 is plugged in the slot 212A of the mobile portion 212 to thereby implement opening and closing along with the mobile portion 212 relative to the operating surface 11. In this embodiment, the host 220 includes a power supply (not shown), a processor (not shown) and a display screen (not shown). Thus, an electrical connection is achieved when the host 220 is plugged with the adaptor structure 210, such that the power supply (not shown) of the host 220 supplies power to the portable keyboard structure 100, and a user is allowed to operate the processor (not shown) through the key area 111 and the touch area 112 of the operating surface 11 and perform display on the display screen (not shown).

In conclusion, the invention is industrially applicable and novel, involves an inventive step, and meets the requirements of a patent application. Therefore, a patent application is filed accordingly. The present invention may be implemented by many other possible embodiments. Without departing from the spirit and the substantiveness of the present invention, various changes and modifications may be made by a person skilled in the art on the basis of the disclosure. It should be noted that, such corresponding changes and modifications are to be encompassed with the scope of protection of the appended claims.

What is claimed is:

1. A portable keyboard structure, comprising: a plastic substrate, having an operating surface and a mounting surface opposite to each other, the operating surface being provided with a key area; a plurality of metal support plates, disposed on corners of the mounting surface; a plastic bottom cover, disposed corresponding to the mounting surface, the plastic bottom cover and the plastic substrate jointly clamping and securing the metal support plates; a plurality of buffer members, respectively configured corresponding to the metal support plates, each of the buffer members comprising a fixing portion and a protection portion, the fixing portions respectively disposed at the corresponding metal support plates, and the protection portions respectively enveloping corners of the plastic substrate, wherein each of the protection portions comprises a top surface, a side surface, and a bottom surface, the side surface extends between the top surface and the bottom surface, and each of the fixing portions is disposed on an interior surface of a corresponding one of the protection portions diametrically opposite the side surface; and a plurality of side support strips, respectively disposed on two sides of the mounting surface, wherein one of the side support strips is disposed between two of the metal support plates.

2. The portable keyboard structure according to claim 1, further comprising:
a metal support;
wherein the operating surface is provided with a touch area, and the metal support is disposed on the mounting surface corresponding to the touch area.

3. The portable keyboard structure according to claim 1, wherein the mounting surface has a plurality of stiffener ribs formed thereon, and the stiffener ribs are arranged in a matrix.

4. The portable keyboard structure according to claim 1, further comprising:
a handle, disposed on one side of the mounting surface, both ends of the handle respectively clamped and secured between a pair of the metal support plates and a pair of the buffer members.

5. The portable keyboard structure according to claim 1, wherein the plastic substrate comprises a screw stud aligned with a positioning hole defined in one of the metal support plates, a hole defined in the plastic bottom cover, and a hole defined in the fixing portion of one of the buffer members.

6. The portable keyboard structure according to claim 1, wherein the plastic bottom cover comprises a lip extending toward the plastic substrate and disposed within a gap defined between a first one of the metal support plates and a second one of the metal support plates.

7. The portable keyboard structure according to claim 1, wherein each of the fixing portions is between an uppermost and a bottommost surface of a corresponding one of the protection portions.

8. The portable keyboard structure according to claim 1, wherein:
the side support strips are detachable from the metal support plates, and
the two of the metal support plates overlap the one of the side support strips.

9. An assembly method for a portable keyboard structure, comprising:
providing a plastic substrate, a plurality of metal support plates, a plastic bottom cover, a plurality of buffer members, and a plurality of side support strips, the plastic substrate having a mounting surface, each of the buffer members comprising a fixing portion and a protection portion, wherein each of the protection portions comprises a top surface, a side surface, and a bottom surface, the side surface extends between the top surface and the bottom surface, and each of the fixing portions is disposed on an interior surface of a corresponding one of the protection portions diametrically opposite the side surface; disposing the side support strips on two sides of the mounting surface; mounting the metal support plates on corners of the mounting surface, wherein one of the side support strips is disposed between two of the metal support plates; disposing the plastic bottom cover corresponding to the mounting surface, such that the metal support plates are clamped and secured between the plastic bottom cover and the plastic substrate; and disposing the fixing portions of the buffer members corresponding to the metal support plates, such that the protection portions respectively envelope corners of the plastic substrate.

10. The assembly method for a portable keyboard structure of claim 9, wherein mounting the metal support plates on corners of the mounting surface comprises:
disposing the metal support plates on the corners of the mounting surface so as to clamp and secure the side support strips.

11. The assembly method for a portable keyboard structure of claim 9, further comprising:
providing a metal support;
wherein an operating surface of the plastic substrate is provided with a touch area, and the metal support is disposed on the mounting surface corresponding to the touch area.

12. The assembly method for a portable keyboard structure of claim 9, further comprising:
providing a handle, respectively disposing both ends of the handle on two adjacent metal support plates of the metal support plates, and disposing the buffer members to clamp and secure the handle between the two adjacent metal support plates and the buffer members.

13. The assembly method for a portable keyboard structure of claim 9, wherein the mounting surface comprises a plurality of stiffener ribs formed thereon, and the stiffener ribs are arranged in a matrix.

14. The assembly method for a portable keyboard structure of claim 9, further comprising:
affixing the buffer members to the plastic substrate through the metal support plates and the plastic bottom cover.

15. An electronic device, comprising: a portable keyboard structure, comprising a plastic substrate, a plurality of metal support plates, a plastic bottom cover, a plurality of buffer members, and a plurality of side support strips, wherein the plastic substrate has an operating surface and a mounting surface opposite to each other, the metal support plates are disposed on corners of the mounting surface and are secured and clamped jointly by the plastic bottom cover and the plastic substrate, the buffer members are respectively disposed corresponding to the metal support plates and protrude from corners of the plastic substrate, the side support strips are respectively disposed on two sides of the mounting surface, one of the side support strips is disposed between two of the metal support plates, each of the buffer members comprising a fixing portion and a protection portion, each of the protection portions comprises a top surface, a side surface, and a bottom surface, the side surface extends between the top surface and the bottom surface, and each of the fixing portions is disposed on an interior surface of a corresponding one of the protection portions diametrically opposite the side surface; an adaptor structure, disposed on one side of the operating surface; and a host, pivotally connected to the adaptor structure and configured to open and close relative to the operating surface.

16. The electronic device according to claim 15, wherein the portable keyboard structure further comprises a metal support, the operating surface is provided with a touch area, and the metal support is disposed on the mounting surface corresponding to the touch area.

17. The electronic device according to claim 15, wherein the mounting surface comprises a plurality of stiffener ribs formed thereon, and the stiffener ribs are arranged in a matrix to form a plurality of quadrilateral slots.

18. The electronic device according to claim 15, wherein the portable keyboard structure further comprises a handle, and the handle is disposed on one side of the mounting surface near the adaptor structure.

19. The electronic device according to claim 15, wherein the portable keyboard structure further comprises a handle, disposed on one side of the mounting surface, both ends of the handle respectively clamped and secured between a pair of the metal support plates and a pair of the buffer members.

* * * * *